Figure 1:
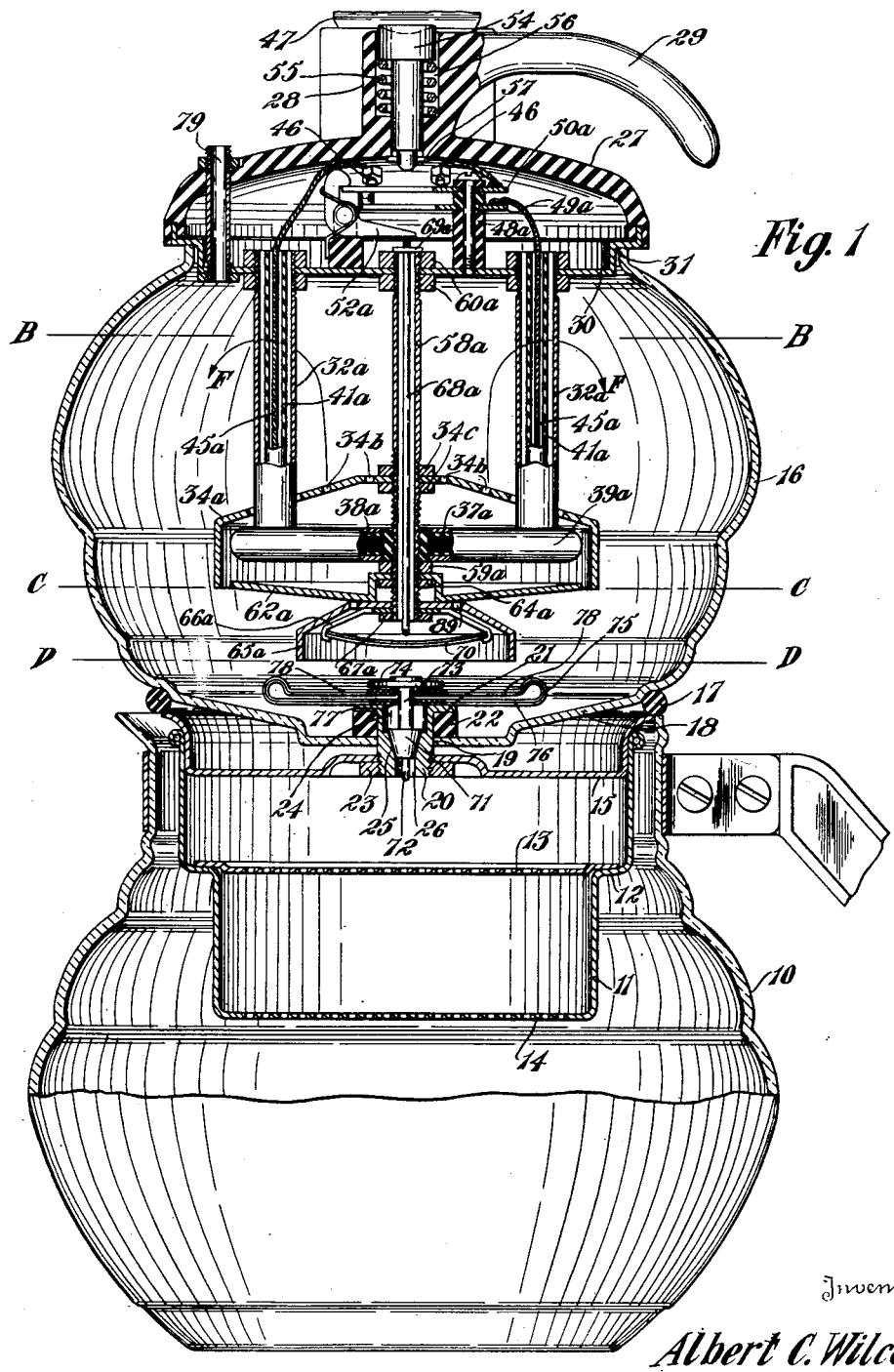

Aug. 11, 1942.  A. C. WILCOX  2,292,853
AUTOMATIC ELECTRIC DRIP COFFEE MAKER
Filed July 5, 1940  4 Sheets-Sheet 1

Inventor
Albert C. Wilcox
By Frease & Bishop
Attorneys

Aug. 11, 1942.   A. C. WILCOX   2,292,853
AUTOMATIC ELECTRIC DRIP COFFEE MAKER
Filed July 5, 1940   4 Sheets-Sheet 3

Inventor
Albert C. Wilcox
By Frease and Bishop
Attorneys

Aug. 11, 1942.  A. C. WILCOX  2,292,853
AUTOMATIC ELECTRIC DRIP COFFEE MAKER
Filed July 5, 1940  4 Sheets-Sheet 4

Inventor
Albert C. Wilcox
By Freese and Bishop
Attorneys

Patented Aug. 11, 1942

2,292,853

UNITED STATES PATENT OFFICE 2,292,853

AUTOMATIC ELECTRIC DRIP COFFEE MAKER

Albert C. Wilcox, East Liverpool, Ohio

Application July 5, 1940, Serial No. 343,915

8 Claims. (Cl. 219—43)

The invention relates to drip coffee makers and particularly to an automatic, electric appliance for making drip coffee.

It is common practice to make drip coffee in a coffee maker comprising a pot or receptacle having a perforated coffee basket at its upper end and a water reservoir above the coffee basket.

After the desired amount of ground coffee has been placed in the coffee basket and the parts of the coffee maker have been assembled in the above order, water which has been heated to boiling is poured into the upper water reservoir.

With such coffee makers it is found that the temperature of the water is initially reduced as it contacts the walls of the water reservoir, and as it requires several minutes for the water to seep through the ground coffee in the coffee basket, there is considerable further loss of temperature of the water by radiation, so that little, if any of the water passes through the ground coffee at the proper temperature to obtain the best results.

The present invention contemplates the provision of a drip coffee maker in which cold water may be placed in the upper water reservoir, electric means being provided for heating the water to the boiling point in the water reservoir so that all of the water is passed through the ground coffee at substantially uniform temperature.

It is known that attempts have been made to produce electric drip coffee makers which continuously heat the water as it is passed to the ground coffee, but such devices as have been made and put into use are not entirely satisfactory.

One type of such drip coffee makers is not entirely automatic and is, therefore, not believed to be satisfactory from a safety point of view because the electric current is not automatically permanently cut off after the water has passed out of the water reservoir.

Another type of electric coffee maker has been used to some extent, but is not entirely satisfactory because it will not properly function with the water used in certain localities.

The object of the present invention is to provide an entirely automatic electric drip coffee maker which will satisfactorily operate with any kind of water and which works automatically to cut off the electric current when all of the water has been heated to the desired temperature, holding the circuit open until it is manually closed for subsequent coffee making operations.

Another object is the provision of a device of this character comprising generally a coffee beverage receptacle or pot, a perforated ground coffee basket at the upper end of the pot and a water reservoir mounted above the ground coffee basket, electric heating means being located within the lower portion of the water reservoir and a thermostatically operated valve controlling the discharge of hot water from the water reservoir to the ground coffee basket.

A further object is to provide a device of this character in which the circuit to the electric heating element is controlled by a switch which may only be closed manually and which is automatically opened by a thermally controlled device when the water is heated to the desired temperature.

Another object is to provide a device of this character in which the electric heating means and thermally controlled switch are suspended as a unit within the cover or lid for the water reservoir and so arranged that the lid or cover with the heating means suspended therefrom may be removed from the water reservoir and placed upon a tea kettle or other utensil for heating water therein.

A still further object is to provide a device of the character referred to in which the valve and the switch are independently operated by separate thermostatic devices.

Still another object is to provide a modified form of such device in which the valve and switch are operated by the same thermostatic device.

Figure 2:
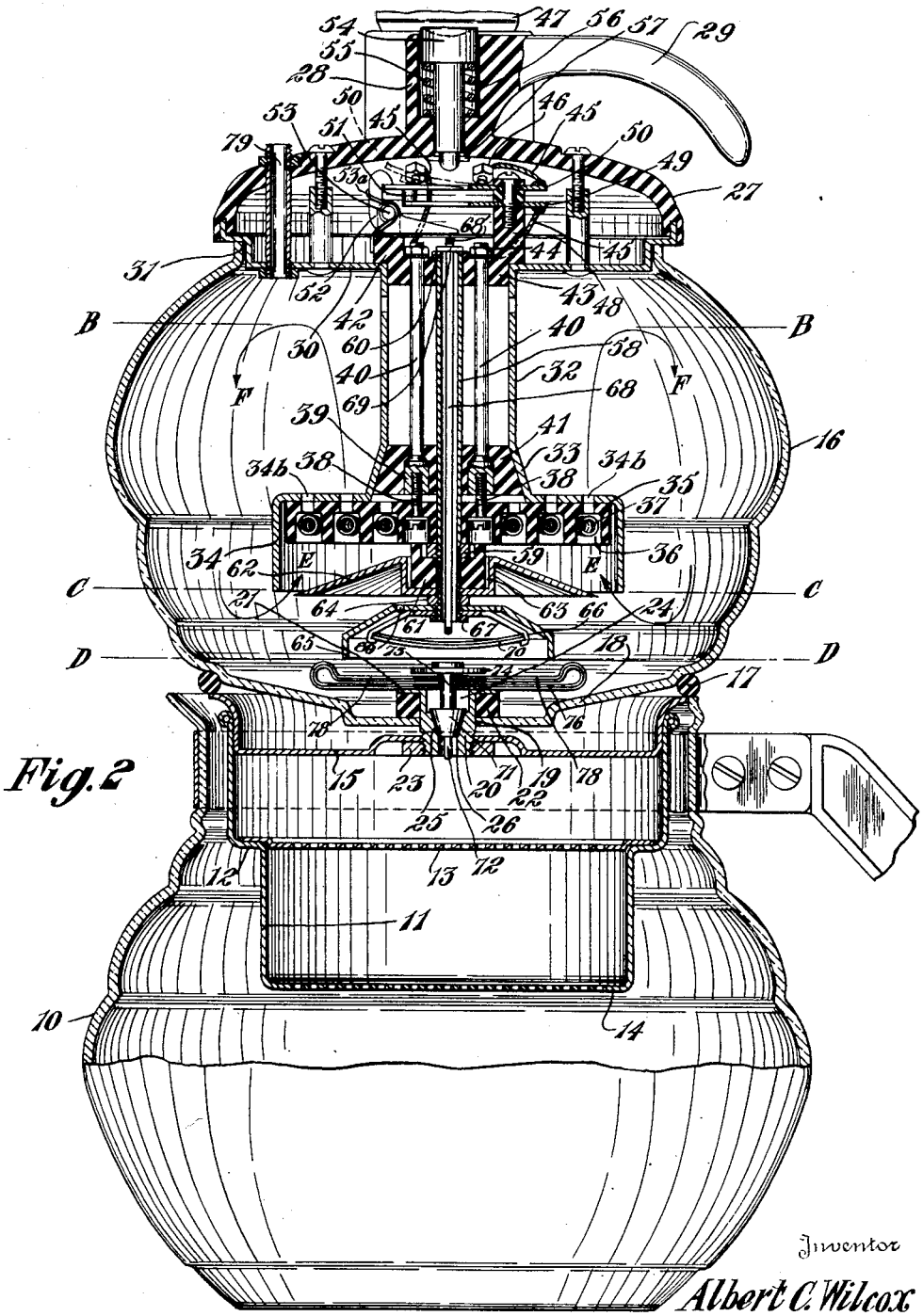
Figure 3:
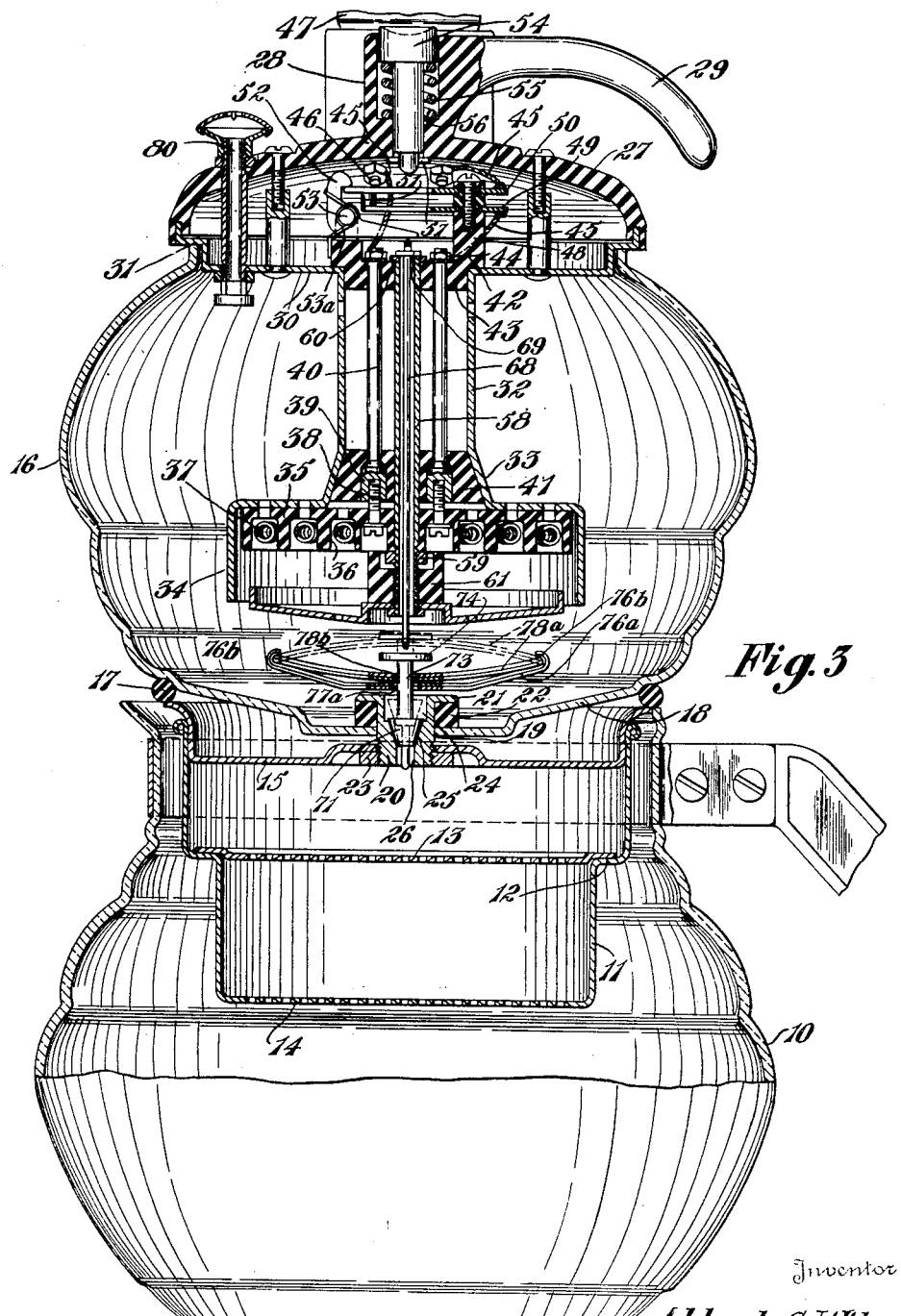
Figure 4:
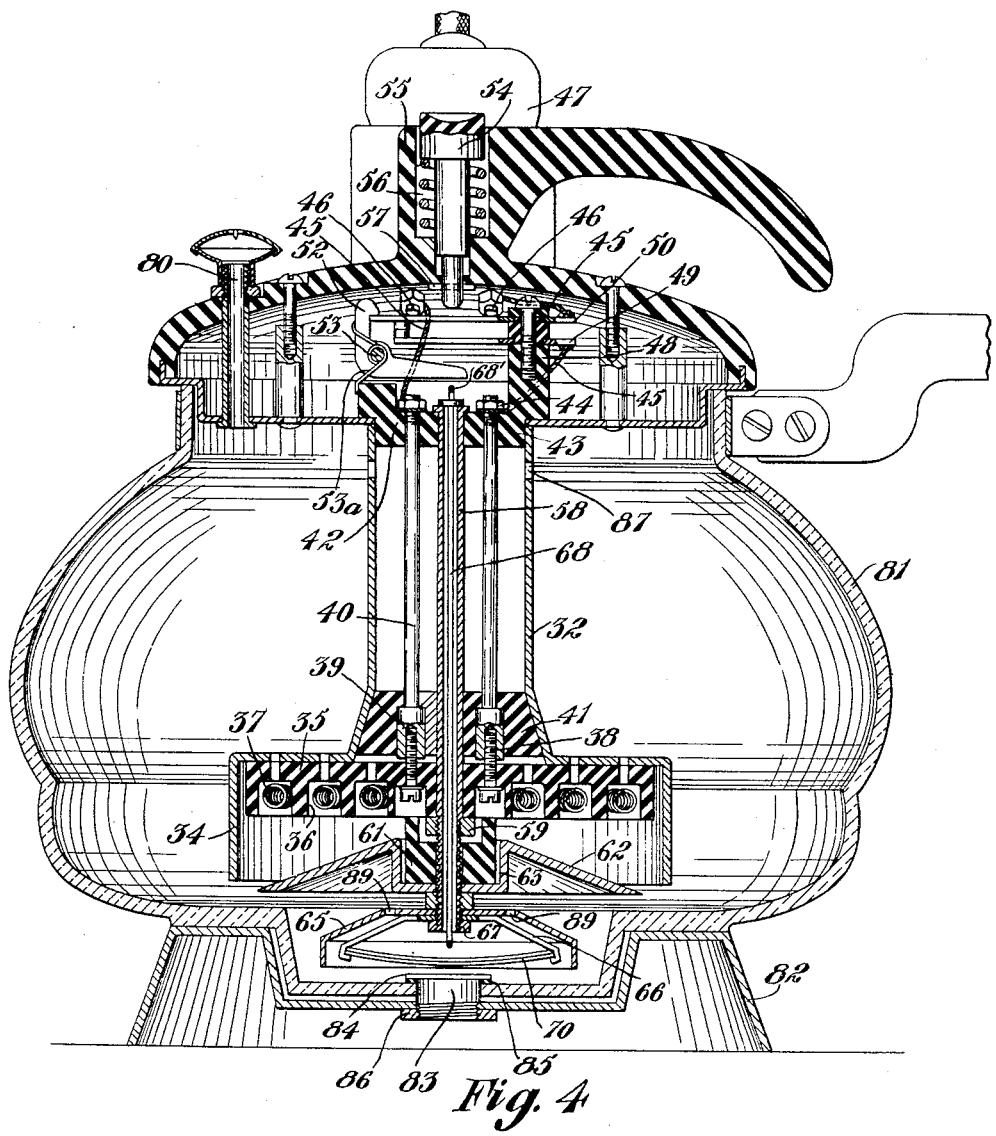
Figure 5:
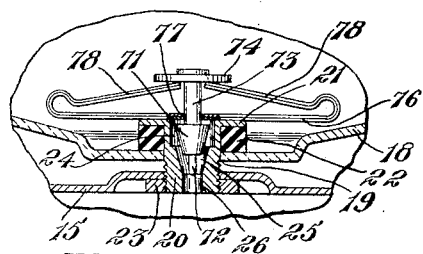

The above objects together with others which will be apparent from the drawings and following description, or which may be later referred to, may be attained by constructing the improved automatic electric drip coffee maker in the manner illustrated in the accompanying drawings in which Figure 1 is a vertical sectional view through a drip coffee maker embodying the invention in which a sealed or enclosed type of heating element is used;

Fig. 2, a similar view of the same type of coffee maker showing the use of an open electric heating element;

Fig. 3, a similar view through a slightly modified form of the invention in which a single thermostatic device is provided for simultaneously opening the valve and opening the switch;

Fig. 4, a vertical sectional view showing the cover or lid with the electric heating unit carried thereby placed upon a teakettle for heating water therein; and Fig. 5, a fragmentary detail sectional elevation of the thermostatic valve operating means of the form shown in Figs. 1 and 2, showing the valve in open position.

The same, or similar, reference numerals are used, as far as possible throughout the different views.

The receptacle or pot for receiving and containing the coffee beverage is indicated generally at 10, and may be formed of any suitable material although pottery ware is preferred.

The ground coffee basket 11 may be formed of sheet metal, preferably, aluminum, and shouldered at a point intermediate its uper and lower ends as at 12 to support a perforated spreader plate 13, the bottom wall 14 of the coffee basket being also perforated.

The upper open end of the coffee basket may be connected in any suitable manner, as by a friction fit or the like, to the sheet metal bottom shell 15 of the water reservoir 16 which may be formed of any suitable insulation material preferably glass.

The bottom of this water reservoir may be provided with a gasket 17 of rubber or the like to prevent contact of the glass water reservoir with the upper open end of the beverage receptacle or pot 10.

The bottom wall 18 of the water reservoir 16 is provided with a central opening 19 through which is located a hollow stud 20 having a peripheral flange 21 at its upper end, between which and the inside of the bottom wall 18 is clamped a rubber gasket 22.

The lower end of the stud 20 is screw threaded to receive a nut 23 which retains the sheet metal bottom shell 15. The upper end of the stud 20 is hollow as shown at 24, this cavity communicating with the conical valve seat 25 which communicates at its lower end with the smaller opening 26.

The lid or cover 27 for the water reservoir 16 may be formed of any desired material when the sealed or enclosed electric unit is used, but where an open unit is used the cover should be a plastic material such as Bakelite, or other suitable insulation material, and has at its center the hollow upright boss 28 upon which is formed a handle 29 for manipulating the cover.

A sheet metal shell 30 is molded into the edge portion of the cover 27 and shouldered as at 31 so as to fit within the open upper end of the water reservoir.

As shown in Figs. 2 and 3, a central tubular housing 32 depends from the shell 30 and may be flared at its lower end as at 33, terminating in an enlarged substantially cylindric housing 34 within which is mounted the electric heating element which may be in the form of an insulation block 35 having grooves 36 therein within which is mounted a coiled wire element 37, or, if desired, any other usual and well-known form of electric heating element may be used such as the enclosed or sealed element shown in Fig. 1.

The open electric element shown in Figs. 2, 3, and 4, may be attached within the housing by means of screws 38 forming the terminals for the wire element 37, and threaded into the screw threaded sockets in the heads 39 at the lower ends of the bolts 40.

These bolts may be located through suitable openings in the conical insulation block 41 fitted within the flared portion 33 of the housing.

An insulation housing block 42 is located within the metal shell 30 at the upper end of the tubular portion 32 thereof and provided with the reduced lower end 43 fitting into the upper end of said tubular portion.

The upper ends of the bolts 40 extend through openings in the insulation block 42 and nuts 44 upon the threaded ends of said bolts clamping the several parts together and also attach the electric lead wires 45 which lead to the plug-in points 46 located angularly through the cover 27 for engagement by the usual connector plug 47, which may be connected by the usual cord to a suitable base receptacle or socket.

A post 48 is formed on one side of the insulation housing block 42 and has mounted thereon and insulated from each other as shown, a pair of spring electric contact strips 49 and 50 having at their free ends contact points 51 adapted to be engaged with each other to close the circuit.

It should be noted that one of the electric lead wires 45 is connected to the corresponding binding post 46 through the spring contact strips 49 and 50 so that the circuit may be broken by separating the contact points 51.

A pivoted locking dog 52 in the form of a bell crank is pivoted at 53 upon the insulation block 42 and provided with a spring 53a for normally urging the locking dog into the position shown in Figures 2, 3, and 4 so as to engage over the free end of the upper spring strip 50 to hold contact points 51 in contact with each other.

It should be explained that the contact strip 50 is so arranged that when the locking dog 52 releases the same the free end of this strip will spring upward to the dotted line position shown in Figure 2 breaking the contact.

A manually operated push button 54 is slidably mounted within the hollow boss 28, a coil spring 55 being interposed between the head of said push button and the bottom of the cavity 56 so as to normally hold the push button in raised position as shown with the stop 57 at the lower end of said push button engaging the underside of the cover 27.

A central housing tube 58 is mounted through the insulation housing block 42, through the insulation block 41 and through the center of the electric heating element and depends below the cylindric housing 34.

A lock nut 59 is located upon said tube spaced from the lower end thereof and a lock nut 60 is mounted upon the upper end of said tube for holding the same in position.

An insulation block 61 is located around the tube 58 within the cylindric housing 34 and recessed at its upper end to receive the lock nut 59.

As shown in Fig. 2, downwardly and outwardly flared metal baffle plate 62 may be located around the tube 58 within the lower end of the cylindric housing 34 and provided with a cavity 63 to accommodate the insulation block 61, a lock nut 64 upon said tube holding the baffle plate in place.

An inverted cup shaped metal housing 65 is mounted on the tube 58 beneath the nut 64 and a downwardly curved spring steel clip 66 is located around the tube within said housing, these parts being clamped in place by a nut 67 on the lower end of the tube 58.

A push rod 68 is located within the tube 58 having a stop 69 near its upper end for limiting downward movement of the push rod. The upper end of this push rod substantially contacts the horizontally disposed portion of the locking dog 52 and the lower end of the rod extends below the lower end of the tube 58.

In the form of the invention shown in Figure 1, a sealed or enclosed type of electric heating unit is used, comprising a wire heating element 37a located between sheets of mica or other suitable insulation 38a and enclosed within a shell of sheet steel or the like 39a.

This heating unit is suspended from the sheet metal cover shell 30 by a pair of metal tubes 32a having insulation tubes 41a therein through which are located the electric leads 45a leading from the electric heating unit to the plug-in points 46.

A metal tube 58a is centrally located through the metal cover shell 30 and through the center of the heating unit, nuts 60a connecting the same to the metal shell 30 and a nut 59a is located around the threaded lower portion of the tube beneath the electric heating element.

A sheet metal shell 34a is located around the electric unit, being of inverted cup shape and provided with a plurality of apertures 34b.

This shell is supported by the tube by means of lock nuts 34c located around the tube on each side of the shell. A baffle shell 62a is carried by the tube and located within the lower open end of the inverted cup shape shell 34a being connected to the tube by means of a lock nut 64a.

The inverted cup shaped metal housing 65a is mounted on the tube 58a beneath the baffle shell 62a and a downwardly curved spring steel clip 66a is located around the tube within said housing, these parts being clamped in place by a nut 67a on the lower end of the tube 58a.

A push rod 68a is located within the tube 58a having a stop 69a near its upper end for limiting downward movement of the push rod.

The upper end of this push rod substantially contacts the horizontally disposed portion of the locking dog 52a which is the same in construction and operation as the locking dog 52 above described, and the lower end of the rod extends below the lower end of the tube 58a.

Spring contact strips 49a and 50a are mounted upon the insulation post 48a and adapted to make and break the circuit through one of the lead wires 45a in the manner described in Figs. 2, 3, and 4, and the locking dog 52a is adapted to normally hold said strips in contact as above described.

Referring to Figs. 1, 2 and 4 a bi-metal strip 70 is mounted within the spring steel clip 66 or 66a and arranged to be normally bowed downward as shown in said figures, the construction and operation of this bi-metal strip being such that when it is flexed upward it will strike the lower end of the push rod 68 or 68a raising the same and swinging the locking dog 52 or 52a upon its pivot to release the upper spring contacting strip 50 or 50a permitting the same to swing to open position as shown in dotted lines in Fig. 2.

In each of Figs. 1, 2, and 3 a conical valve 71 is arranged to be normally seated upon the conical valve seat 25 and is provided with a depending stem portion 72 normally located within the reduced opening 26 and with an upstanding stem 73 having a flanged head 74 at its upper end.

Referring now to Figs. 1, 2, and 5, the valve 71 is arranged to be raised from its seat by means of a bi-metal strip of double hairpin shape indicated at 75.

The lower double length leg 76 of the bi-metal strip has a central opening 77 through which the stem 73 of the valve is slidably mounted, and the ends of the upper legs 78 terminate beneath the head 74 on each side of the stem so that when the same are flexed by change in temperature, as shown in Fig. 5, they will raise the valve 71 from its seat, as shown in said figure, to permit water from the reservoir 16 to flow through the central opening in the stud 28 and into the coffee basket 11.

In the form of thermostatic device shown in Fig. 3, the valve and switch are both designed to be opened by the same thermostatic device; this comprises a bi-metal strip 78a having its ends bent upwardly and formed into inturned hooks 78b, a central opening 77a being formed in said bi-metal strip to slidably receive the valve stem 73.

A substantially arcuate downwardly curved bi-metal strip 78a has its ends secured beneath the hooks 78b and is provided with a central opening 78b to slidably receive the valve stem 73.

When subjected to sufficiently high temperature the bi-metal strip 78a will be bowed upward as indicated in dotted lines in Fig. 3 raising the valve 71 to open position and raising the push rod 68 to release the locking dog 52 and permit the spring contact arm 50 to fly open.

A bleeder tube 79 to release excess steam as shown in Figs. 1 and 2 or a whistle 80 as shown in Fig. 3 may be provided in the cover or lid.

Fig. 4 shows the application of the invention into a teakettle comprising generally a receptacle portion 81 of glass or the like mounted upon a metal base 82 by means of the central threaded stud 83 having a flanged head 84 beneath which is received a gasket 85, a nut 86 drawing the parts tightly together and sealing the central opening in the teakettle bottom.

This figure shows the lid or cover with the heating unit as shown in Fig. 2 removed from the drip coffee maker and placed upon the teakettle.

It should be understood that this is merely for the purpose of illustration and that the other forms of heating units carried by the cover may be applied to the teakettle or other receptacle in the same manner.

The operation of the drip coffee makers shown in Figs. 1 and 2 will be substantially the same and the operation of these forms of the invention is first described.

The desired amount of coffee is placed in the coffee basket 11, the spreader plate is placed therein and the coffee basket is inserted into the upper end of the pot 10 with the water reservoir or receptacle 16 placed thereon.

Cold water is then placed in the reservoir or upper container 16 substantially to the level indicated by the line B—B, and the cover is then placed in position assembling the appliance as shown in Figs. 1 and 2.

The push button 54 is then depressed striking the upper spring contact strip 50 swinging the same into locked position as shown in full lines in both of said figures, the locking dog snapping back over the contact strip 50 to hold it in closed position.

The water contacting the electric element in the lower portion of the reservoir 16 immediately starts to heat and flows up through the bleeder ports 34b and out in the direction of the arrows F.

Any steam which is generated is released from the central tube 32 through the bleeder ports 87. The water circulates down again and enters the shell 34 or 34a as indicated by the arrows E—E.

This action continues until the water comes approximately to the boiling point between the lines B—B and C—C after which the heated water starts to radiate and roll down in a rolling manner to the line D—D.

As the highly heated water contacts the bi-metal strip 76, the upper legs 78 thereof start to raise toward the position shown in Fig. 5, raising the valve 71 just a trifle permitting water to pass through the central opening of the stud 20 and into the coffee basket.

At the same time the boiling water contacts the bi-metal strip 70 which immediately becomes active and snaps upward at its center raising the push rod 68 and operating the locking dog 52 to release the spring contact strip 50 opening the switch which must remain open until it is again manually closed.

As the bi-metal strip 76 assumes the position shown in Fig. 5, the valve is fully opened and all of the boiling water is passed through the coffee basket to brew drip coffee by the well-known method.

The space between the metal shells 62 and 65 serves to trap water at a slightly lower temperature so as to prevent the radiation of heat down through the shell 65 to operate the bi-metal strip.

This bi-metal strip must be actuated by the hot water contacting the same.

The action of the bi-metal strip 70 may be hastened or retarded by the size and number of port holes 89. By enlarging or increasing the number of these ports the operation of the bi-metal strip is hastened, and by eliminating these ports entirely the operation may be very much prolonged.

By lengthening or shortening the metal housing 32—34 the heating action can be prolonged or shortened.

The operation is very similar with a construction such as shown in Fig. 3, excepting that when the water at boiling temperature reaches the bi-metal strips 76a and 78a the strip 78a will be bowed upward simultaneously opening the valve and the switch.

It should be understood that either the sealed unit shown in Fig. 1, or the open unit shown in Figs. 2, 3 and 4 may be used in any of the forms of the invention disclosed herein, without in any way departing from the spirit of the invention as set forth in the claims.

I claim:

1. A drip coffee maker including a water container, a coffee basket beneath the water container, a valve at the bottom of the water container having an upright stem with a flanged head thereon, an electric heating element within the water container, a switch controlling the electric heating element, manual means only for closing said switch, a push rod for operating the switch, and thermostatic means within the water container for engaging said flanged head and said push rod for opening the valve and the switch.

2. A drip coffee maker including a water container, a coffee basket beneath the water container, a valve at the bottom of the water container having an upright stem with a flanged head thereon, an electric heating element within the water container, a switch controlling the electric heating element, manual means only for closing said switch, a push rod for operating the switch, and single thermostatic means within the water container for engaging said flanged head and said push rod for opening the valve and the switch.

3. A drip coffee maker including a water container, a coffee basket beneath the water container, a valve at the bottom of the water container having an upright stem with a flanged head thereon, an electric heating element within the water container, a switch controlling the electric heating element, manual means only for closing said switch, a push rod for operating the switch, and separate thermostatic means within the water container for engaging said flanged head and said push rod for opening the valve and the switch.

4. A drip coffee maker including a water container, a coffee basket beneath the water container, a valve at the bottom of the water container, an electric heating element within the water container, a switch controlling the electric heating element, manual means only for closing said switch, and thermostatic means within the water container for opening the valve and the switch.

5. An electrical utensil including a water container, a cover for the container, an inverted cup shape housing suspended from the cover and located in the container, there being openings in the top of said housing, an electric heating element in the housing, a baffle in the lower open end of the housing, the outer edge of the baffle being spaced from the housing, a switch carried by the cover for controlling the electric heating element, a bi-metal strip suspended below the housing, a smaller inverted cup-shape housing surrounding the bi-metal strip, and a push rod arranged to be operated by the bi-metal strip to open the switch.

6. An electric utensil including a water container, a cover for the container, a tube suspended from the cover, an inverted cup-shape housing suspended from the tube and located in the container, there being openings in the top of said housing, an electric heating element in the housing, a baffle in the lower open end of the housing, the outer edge of the baffle being spaced from the housing, a switch carried by the cover for controlling the electric heating element, a bi-metal strip suspended below the housing, a smaller inverted cup-shape housing surrounding the bi-metal strip, and a push rod located through the tube and arranged to be operated by the bi-metal strip to open the switch.

7. An electric utensil including a water container, an electric heating element within the water container, a valve at the bottom of the water container, a switch controlling the electric heating element, means normally urging the switch to open position, manual means only for closing the switch, pivoted, spring biased latch means for holding the switch in closed position when the manual means is operated, a longitudinally movable push rod for releasing the latch means, and thermostatic means within the water container for opening the valve and moving it against the push rod to release the latch means and permit the switch to open, said thermostatic means comprising a curved bi-metal strip with hooked ends and a second curved bi-metal strip having its ends engaged in said hooked ends and having its intermediate portion operatively associated with the valve.

8. An electric utensil including a water container, an electric heating element within the water container, a valve at the bottom of the water container, a switch controlling the electric heating element, means normally urging the switch to open position, manual means only for closing the switch, pivoted, spring biased latch means for holding the switch in closed position when the manual means is operated, a longitudinally movable push rod for releasing the latch means, and thermostatic means within the water container for opening the valve and the switch, said thermostatic means comprising a bi-metal strip of substantially double hair pin shape for opening the valve and a curved bi-metal strip for moving the push rod to release the latch means and permit the switch to open.

ALBERT C. WILCOX.